H. J. SCHULTE.
DRAW BAR HITCH FOR TRACTORS.
APPLICATION FILED MAR. 17, 1919.

1,303,504.

Patented May 13, 1919.

Inventor:
H. J. Schulte,
by Hazard & Miller
Attys.

UNITED STATES PATENT OFFICE.

HENRY J. SCHULTE, OF FULLERTON, CALIFORNIA.

DRAW-BAR HITCH FOR TRACTORS.

1,303,504. Specification of Letters Patent. Patented May 13, 1919.

Application filed March 17, 1919. Serial No. 283,215.

*To all whom it may concern:*

Be it known that I, HENRY J. SCHULTE, a citizen of the United States, residing at Fullerton, in the county of Orange and State of California, have invented new and useful Improvements in Draw-Bar Hitches for Tractors, of which the following is a specification.

My object is to make a drawbar for Fordson tractors and the like, and my invention consists of the novel features herein shown, described and claimed.

Figure 1:
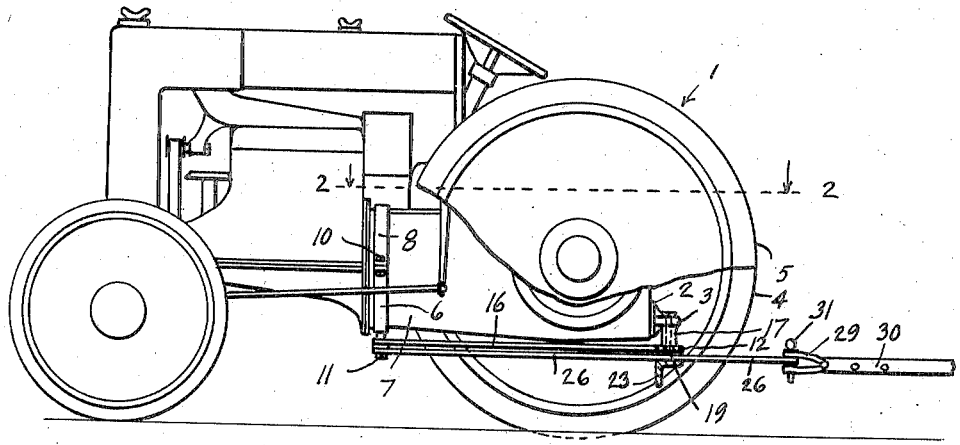
Figure 1 is a side elevation of a tractor showing a drawbar embodying the principles of my invention in use, parts being broken away and shown in section.
Figure 2:
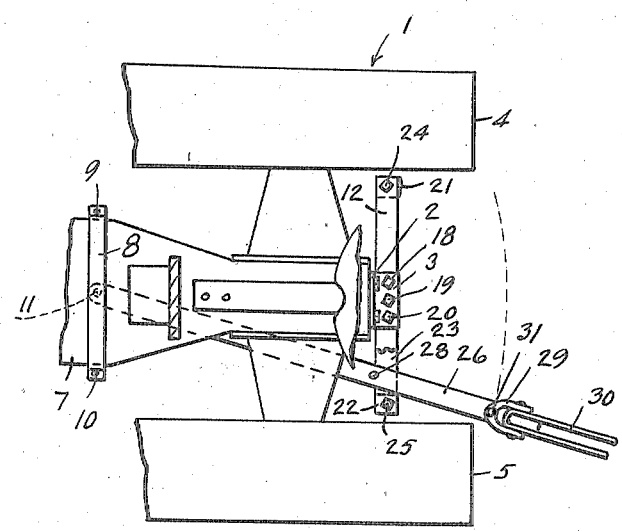
Fig. 2 is a fragmentary plan section on the line 2—2 of Fig. 1 and looking downwardly.
Figure 3:
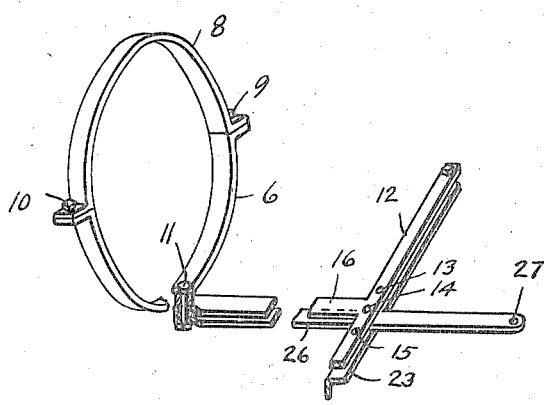
Fig. 3 is a fragmentary perspective of the drawbar removed from the tractor.

The tractor 1 has a drawbar cap 2 at the rear end of the gear casing, and a plate 3 extends backwardly from the drawbar cap and has three vertical holes for the attachment of the regular drawbar. The plate 3 is considerably in front of the rear extremities 4 and 5 of the rear wheels, and when the drawbar, or tongue, of the implement attached to the plate 3 swings to one side or the other, as in making a short turn, the implement will collide with the wheels.

One of the principal objects of my invention is to make a longer and less angular connection.

The half clamping ring 6 is placed upwardly against the transmission case 7, the mating half clamping ring 8 is placed downwardly against the transmission case 7 and the ends of the half clamping rings 6 and 8 are bent outwardly and connected together by bolts 9 and 10 to clamp the ring upon the case. A stud 11 is fixed through the center of the half clamping ring 6 and extends downwardly. A crossbar 12 has bolt holes 13, 14 and 15 at its center and a bar 16 extending forwardly from its center, and the stud 11 extends through the forward end of the bar 16. The crossbar 12 is placed under the plate 3, collars 17 are placed between the crossbar 12 and plate 3 in line with the bolt holes, and bolts 18, 19 and 20 are inserted upwardly through the crossbar 12, through the collar 17, and through the plate 3, and nuts are placed upon the upper ends of the bolts. Spacing blocks 21 and 22 are placed under the ends of the crossbar 12, an angle iron 23 is placed upwardly against the blocks, and bolts 24 and 25 are inserted through the ends of the crossbar 12, through the spacing blocks 21 and 22, and through the ends of the angle iron 23.

The drawbar 26 is inserted between the crossbar 12 and the angle iron 23 and connected to the lower end of the stud 11, said drawbar 26 having a clevis pinhole 27 in its rear end beyond the extremities 4 and 5 of the wheels and a bolt hole 28 in position, so that the bolt 19 may be removed and inserted through the bolt hole 28 to hold the drawbar 26 from swinging when desired. The clevis 29 connected to the forward end of the implement tongue 30 fits the rear end of the drawbar 26, and the clevis pin 31 may be inserted through the forward end of the clevis 29 and through the clevis pinhole 27 of the drawbar, thereby connecting the implement to the tractor.

The drawbar 26 connected to the stud 11 and to the clevis pin 31 makes a double jointed connection as compared with connecting the clevis pin 31 directly to the plate 3, and makes a longer connection and provides means for making a short turn without bringing the implement into contact with the wheels.

The bar 16 forms an effective brace for the stud 11 and serves to hold the ring and stud from slipping backwardly upon the case 7. The forward end of the bar 16 is formed integral with the crossbar 12 directly at the point where the bolts 18, 19 and 20 secure the crossbar 12 to the plate 3, so that all the strain of the drawbar 26 comes upon the bolts and plate.

Thus I have produced a drawbar for tractors which is easily applied, which forms a longer connection and extra joint, and which materially reduces the angularity between the tractor and the farm implement in turning. Furthermore, the draft of the farm implement is connected to the tractor at a point substantially half way between the front and rear wheels and passes below the rear axle instead of being connected at a point behind the rear axle.

Various changes may be made without departing from the spirit of my invention as claimed.

I claim:

1. A drawbar for tractors comprising means for connecting a stud to the transmission case so that the stud will extend downwardly at a point in front of the rear axle, and a bar connected to the stud and adapted for connection to a farm implement.

2. A drawbar for tractors comprising a crossbar adapted to be mounted behind and below the rear axle, a ring adapted to be clamped to the transmission case, a stud extending downwardly from the ring, a brace connecting the stud to the crossbar, and a bar pivotally mounted upon the stud and extending backwardly beyond the rear wheels.

3. A drawbar for tractors comprising means for connecting a stud to the transmission case, means for bracing the stud, and a bar pivotally connected to the stud and extending backwardly beyond the rear axle.

In testimony whereof I have signed my name to this specification.

HENRY J. SCHULTE.